(12) United States Patent
Oyama (10) Patent No.: US 6,542,303 B1
(45) Date of Patent: Apr. 1, 2003

(54) LIGHT DISTRIBUTION CONTROLLING APPARATUS, LUMINOUS FLUX DENSITY CONTROLLING APPARATUS AND PARTITIONING METHOD

(75) Inventor: Nobuo Oyama, Tokyo (JP)

(73) Assignee: Kabushiki Kaisha S-T-I-Japan, Tokyo (JP)

( * ) Notice: Subject to any disclaimer, the term of this patent is extended or adjusted under 35 U.S.C. 154(b) by 0 days.

(21) Appl. No.: 09/720,738

(22) PCT Filed: Jun. 24, 1999

(86) PCT No.: PCT/JP99/03377

§ 371 (c)(1),
(2), (4) Date: Dec. 29, 2000

(87) PCT Pub. No.: WO00/00856

PCT Pub. Date: Jan. 6, 2000

(30) Foreign Application Priority Data

Jun. 29, 1998 (JP) .............................. 10-182452

(51) Int. Cl.[7] .......................... G02B 17/00; G02B 27/00
(52) U.S. Cl. ......................................... 359/591; 359/593
(58) Field of Search ................................ 359/591, 592, 359/593

(56) References Cited

U.S. PATENT DOCUMENTS

| | | | | |
|---|---|---|---|---|
| 3,096,684 A | * | 7/1963 | Kegg et al. .................. | 359/593 |
| 3,124,311 A | * | 3/1964 | Kruger ........................ | 362/342 |
| 3,438,699 A | * | 4/1969 | Seeger ........................ | 359/596 |
| 3,453,039 A | * | 7/1969 | Osborne ...................... | 359/593 |
| 3,936,157 A | * | 2/1976 | Kapany ....................... | 359/591 |

* cited by examiner

Primary Examiner—Russell Adams
Assistant Examiner—Magda Cruz
(74) Attorney, Agent, or Firm—Rothwell, Figg, Ernest & Manbeck (57) ABSTRACT

An area or a part which is shaded or does not receive a sufficient amount of light due to a structure or other objects is irradiated by light distribution control or luminous flux density control with diffusion, refraction, division and the like of light. Sunbeams are diffused by a transparent body disposed above two buildings, and the diffused light reaches an area or a part that has conventionally been shaded.

22 Claims, 8 Drawing Sheets

LIGHT DISTRIBUTION CONTROLLING APPARATUS, LUMINOUS FLUX DENSITY CONTROLLING APPARATUS AND PARTITIONING METHOD

BACKGROUND OF THE INVENTION

1. Field of the Invention

The present invention relates to a technology for introducing sunlight into a building or a shaded area between buildings, and a daylighting technology for sunlight or artificial light in a greenhouse, a farming, culturing pond or the like, and indoors.

2. Related Art

Conventional introduction of sunlight into a building or a shaded area between buildings has been expensive, which pursues the sun and introduces sunlight by a reflecting body. In a greenhouse, a daylighting to each cultivation shelf was conducted by distributing light of a diffusing material with low transmittance that diffuses light in all directions, in a farming pond, natural sunlight was used as it is, and in a culturing pond, opportunity of cultured products getting sunlight was averaged by agitation. Conducting a daylighting in each indoor part depended on light distribution by incidence of sunlight and illumination.

A method of introducing sunlight into a building or a shaded area between buildings by pursuing the sun and reflecting sunlight by a reflecting body is extremely expensive, and it is unrealistic to acquire sufficient amount of light with this method. In addition, since the light distribution that diffuses light in all directions in a greenhouse wastes a large amount of available light and causes lack of sufficient light amount, such means is not usually used for increasing the efficiency of using space in a greenhouse, hence many greenhouses still have low efficiency of using space. Although agitation in a culturing pond has an effect of increasing efficiency of using optical energy, there remains problems in that a large amount of light that is incident at a large incident angle with respect to a water surface is lost by reflection, and that irradiation of light to a cultured product is limited to near the water surface. utilizing a large amount of illumination such as a desk stand light for a daylighting in each indoor part holds the use of other available light indoors at a low level.

SUMMARY OF THE INVENTION

The present invention has been devised in order to solve the above-mentioned problems, and it is an object of the present invention to provide means for irradiating sufficient amount of light to an area or a part, which is shaded or prevented from receiving enough amount of light by a structure or other objects, by light distribution control or luminous flux control with diffusion, refraction, division and the like of light.

A light distribution controlling apparatus in accordance with the present invention is an apparatus for distributing light to an area or a part which does not receive light as it stands by changing a progressing direction of light using a transparent body for performing diffusion, refraction or division, or complex of diffusion and refraction of light, and a luminous flux density controlling apparatus is an apparatus for increasing an amount of beams advancing to a specific area or part requiring a large amount of light by guiding beams proceeding to an area or a part neighboring of the specific area or part, to the specific area using the above-mentioned transparent body.

In addition, light distribution with excellent uniformity and less waste can be realized by combining such a light distribution controlling apparatus and a luminous flux controlling apparatus.

The transparent body can be formed from a transparent body on which multiple protrusions having a cross section in an arc form, an angle form, a triangle form and a wave form are arranged. As such a transparent body, a transparent body in a flat plate form or a film form which has such multiple protrusions formed in parallel with each other on at least one of its surfaces, a transparent body consisting of a bundle of multiple mono-filaments or bar-shaped bodies, or a transparent body consisting of textiles into which multiple mono-filaments or bar-shaped bodies are woven can be used.

Conventionally, for light distribution with high uniformity over an entire objective area including an area or a part to which light does not reach easily, light distribution to small parts or deep parts can be attained and a percentage of beams that are eventually unused can be minimized by guiding beams progressing to an area or a part neighboring a specific area or part to the specific area or part by a transparent body, increasing a luminous flux density of the specific area or part, and performing diffusion, refraction or division, or complex of diffusion and refraction on the beams using the transparent body.

In addition, in some cases, the uniformity of light distribution can be increased and, at the same time, the percentage of beams that are eventually unused can be further minimized by repeating such a light distribution control.

A partitioning method in accordance with the present invention is a method for conducting a daylighting in a space partitioned by an indoor or interior partition material while obstructing view such that a shape of a person or an article cannot be identified across the partition material by using a transparent body, which performs diffusion or complex of diffusion and refraction on light incident on one surface of a plate form, a film form or a cloth form to emit the light from the other surface, as the partition material, and performing diffusion or complex of diffusion and refraction on the light incident in the one surface to transmit in a specific direction.

DETAILED DESCRIPTION OF THE PREFERRED EMBODIMENTS

Embodiments of the present invention will be hereinafter described based on the attached drawings.

Embodiment 1

Figure 1:
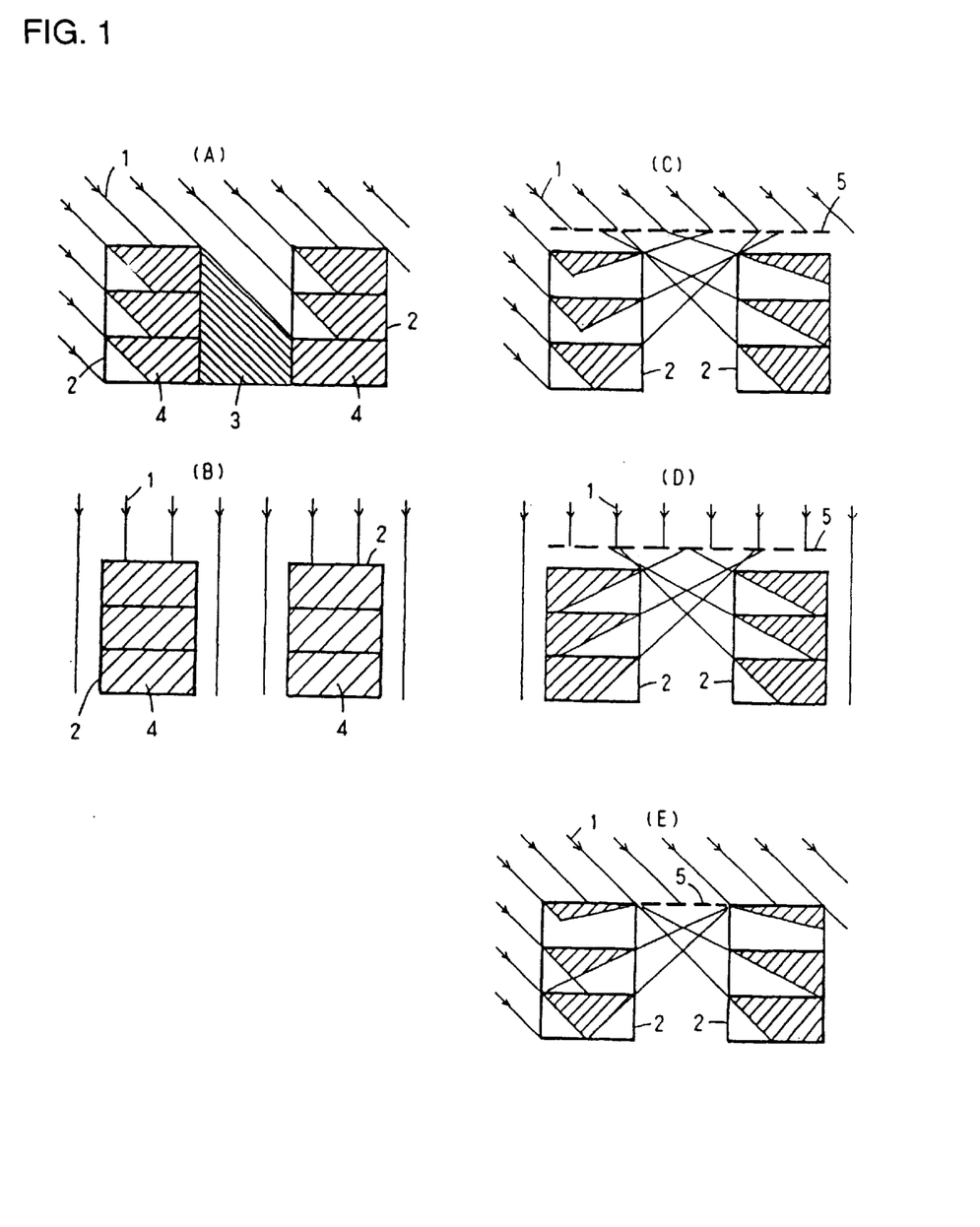
FIG. 1 shows states of sunlight incident in two buildings and shades, (A) and (B) showing conventional states and (C) through (E) showing states in the case in which Embodiment 1 of the present invention is applied.

FIG. 1 shows a light distribution controlling apparatus in accordance with Embodiment 1 of the present invention. As shown in the figure, three-story buildings 2 are built side by side. In this case, as shown in FIG. 1(A), when sunbeams 1 are incident from upper left direction, a shaded part 3 of a building and shaded parts 4 occurring indoors due to a structure of a building are formed. Similarly, as shown in FIG. 1(B), when sunbeams 1 are incident from upper vertical direction, shaded parts 4 are formed indoors.

Figure 4:
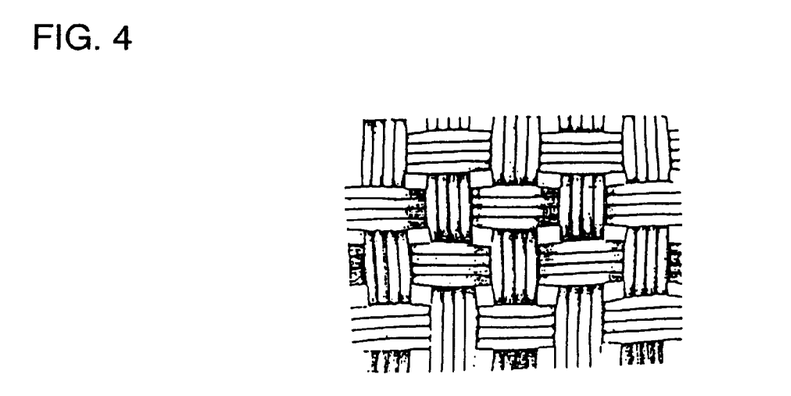
FIG. 4 is a plan view illustrating an example of a transparent body used in the present invention.
Figure 5:
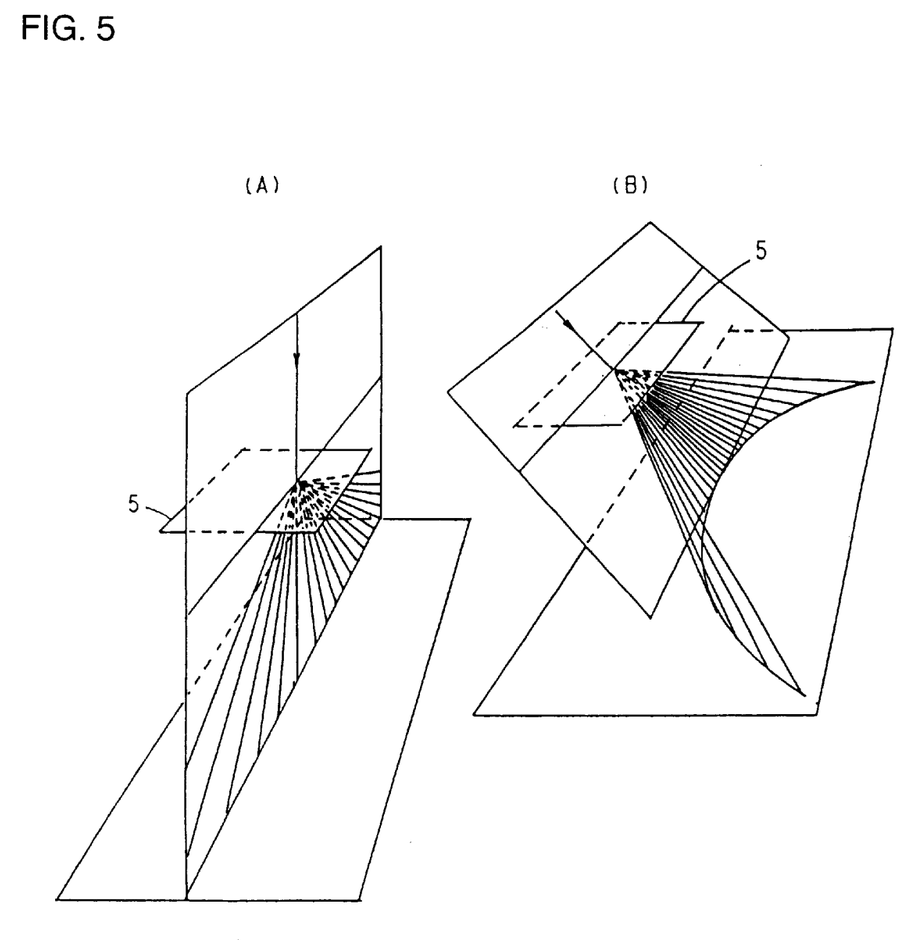
FIG. 5 illustrates diffusion characteristics of a transparent body.

Therefore, as shown in FIG. 1(C), a transparent body 5 is disposed above the two buildings 2. In this case, as shown in FIGS. 2(A) through (D) and FIGS. 3(A) through (I), a transparent body in a flat plate form or a film form on which multiple protrusions having a cross section in an arc form, an angle form, or a wave form are arranged can be used as the transparent body 5. Moreover, as shown in FIG. 4, a transparent body consisting of textile into which multiple mono-filaments or bar-shaped body are woven can be used. These transparent bodies 5 have diffusion characteristics, for example, shown in FIGS. 5(A) and (B).

The transparent body 5 is disposed in an orientation in which the protrusions on its surface are substantially parallel with opposing surfaces of the two buildings 2. As shown in FIGS. 1(C) and (D), the sunbeams 1 are diffused by the transparent body 5, and the diffused light reaches an area or a part that was conventionally shaded. It is seen that shaded areas indicated by hatched parts in FIGS. 1(C) and (D) are considerably reduced compared with the shaded areas in FIGS. 1(A) and (B) in which the transparent body 5 is not used. As shown in FIG. 1(E), the transparent body 5 may be disposed in the level of the highest sides of the two buildings 2.

Embodiment 2

Figure 6:
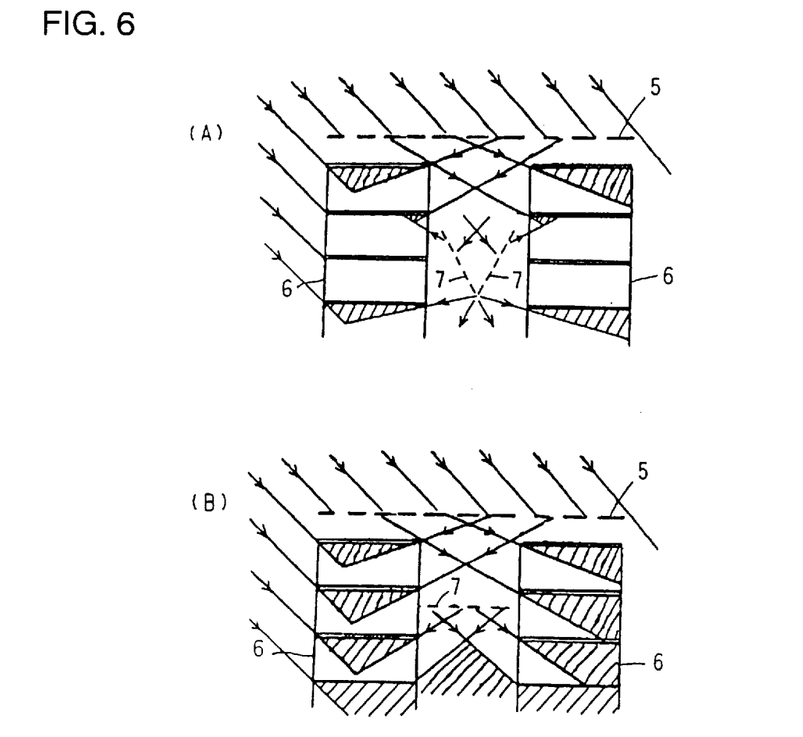
FIG. 6 illustrates states of sunlight incident in two buildings and shades in the case in which Embodiment 2 of the present invention is applied.

As shown in FIG. 6(A), if not only the transparent body 5 is disposed above the two buildings 6 but also a transparent body 7 is disposed between two buildings 6, the number of beams proceeding to inside the buildings 6 is increased, and the percentage of the beams that are eventually unused can be smaller and, at the same time, uniformity of light distribution can be increased.

Figure 7:
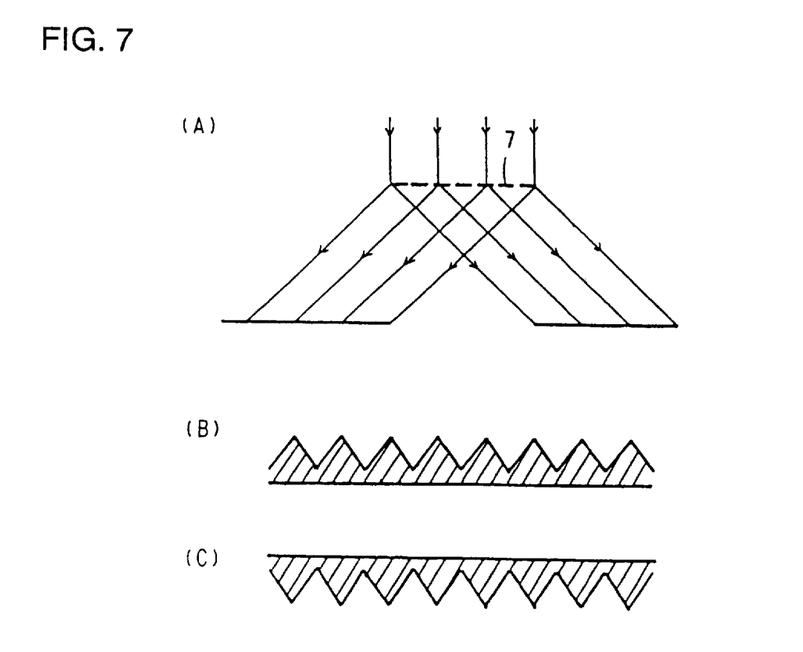
FIG. 7 shows a transparent body used in the present invention, (A) illustrating a diffusion characteristic thereof, (B) and (C) being cross-sectional views thereof.

In a case that the transparent body 7 has protrusions in a prism form as shown in FIG. 7(B) or (C) and has a diffusion characteristic as shown in FIG. 7(A), even if the transparent body 7 is disposed horizontally between the two buildings 6 as shown in FIG. 6(B), multiple beams incident in the transparent body 7 are incident inside both the buildings 2.

Embodiment 3

Figure 8:
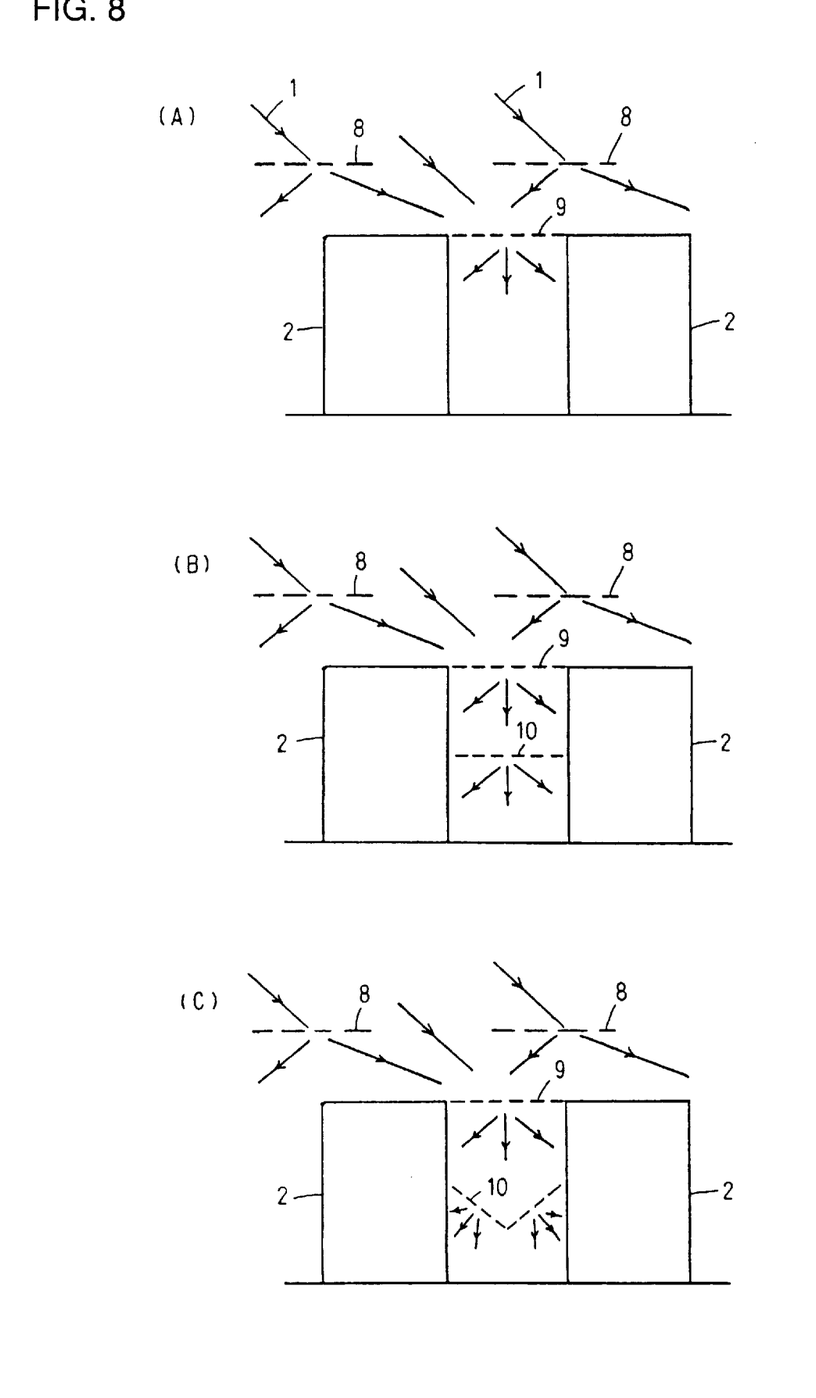
FIG. 8 illustrates states of sunlight incident in two buildings in the case in which Embodiment 3 of the present invention is applied.

As shown in FIG. 8(A), multiple beams can be directed to the part between the buildings 2 by making the sunbeams 1 shining in on rooftops of both the buildings 2 incident in transparent bodies 8 disposed above the buildings 2, and by further disposing a transparent body 9 between these two buildings 2 and in the same level as the rooftops of the buildings 2, the beams can be directed downward while performing diffusion, refraction or division, or complex of diffusion and refraction of the beams by the transparent body 9. According to this method, it becomes possible to forward more beams to the part between the two buildings 2 compared with the method in which the single transparent body 5 is used as shown in FIGS. 1(C), (D) and (E).

Moreover, as shown in FIGS. 8(B) and (C), if a transparent body 10 is disposed below the transparent body 9 and between the two buildings 2, further more beams can be introduced into the buildings 2.

Concerning cultivation of plants in a greenhouse, the buildings 2 in the descriptions of each of the above-mentioned embodiments may be read as cultivation shelves or tall plants, and utilization ratio of sunlight and utilization ratio of spaces in the greenhouse can be considerably improved.

Concerning an application in farming, or in a pond for culturing algae or photosynthetic bacteria, by covering the water surface by a transparent body, reflection on a water surface of light that is incident at a large incident angle with respect to the water surface can be reduced, and it becomes possible to introduce a larger amount of light into water. In this case, the direction of protrusions of the transparent body is preferably adjusted to a position in which the largest amount of sunlight can be introduced into water according to a place where the transparent body is used.

In addition, by disposing a transparent body above the water surface, beams can be collected in a specific area, and a larger amount of light can be supplied to cultivated products or cultured products under the water surface. In this case, if the water surface of the specific area is covered by a transparent body, a ratio of a daylighting into water can be increased. Moreover, a utilization ratio of sunlight can be improved by adding transparent bodies under the water surface or disposing reflecting bodies.

Embodiment 4

Figure 9:
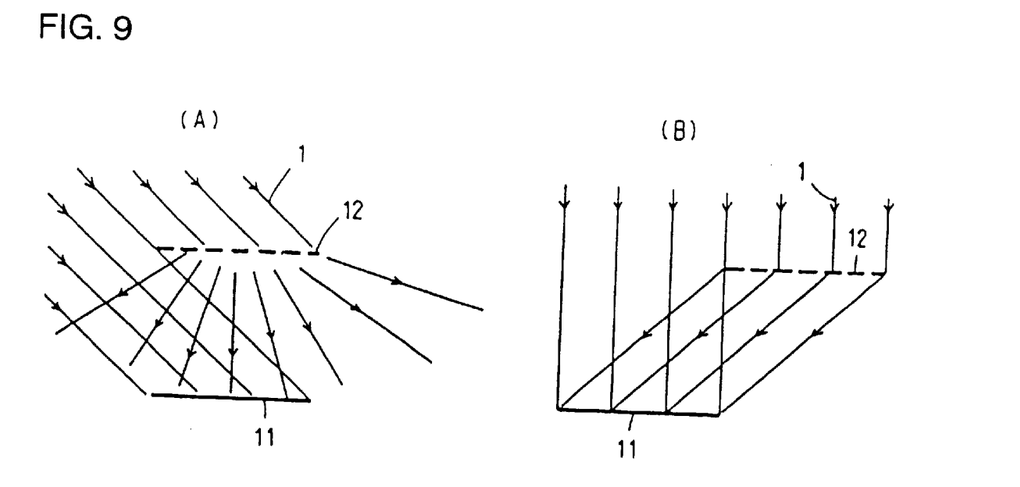
FIG. 9 illustrates states of light incident in a solar cell panel in the case in which Embodiment 4 of the present invention is applied.

As shown in FIGS. 9(A) and (B), if a transparent body 12 is disposed in the vicinity of a solar cell panel 11, and sunbeams 1 proceeding to a periphery of the solar cell panel 11 are collected on the solar cell panel 11 by diffusion, refraction or division, or complex of diffusion and refraction by the transparent body 12, power generation of the solar cell can be increased. In the same manner as in FIGS. 9(A) and (B), by collecting sunlight and artificial light in the environment, larger amount of light can be introduced into a specific indoor area.

Embodiment 5

Figure 10:
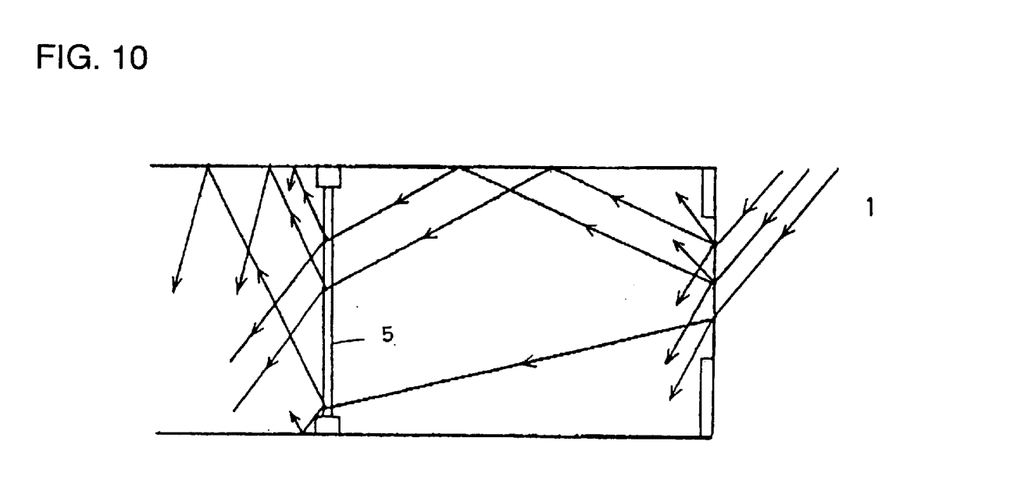
FIG. 10 illustrates a state of light incident in a room in the case in which Embodiment 5 of the present invention is applied.

Conventionally, since a partition used indoors consists of a nontransparent body, light from outside is blocked by the partition and, thus, illumination equipment is often required in order to supplement light in a space divided by the partition, but as shown in FIG. 10, by using a transparent body 5 such as shown in FIG. 2(A) through (D), FIG. 3(A) through (I), and FIG. 4 as a partition material, it becomes possible to introduce light into the space inside the partition even if illumination equipment is not specifically used.

Figure 2:
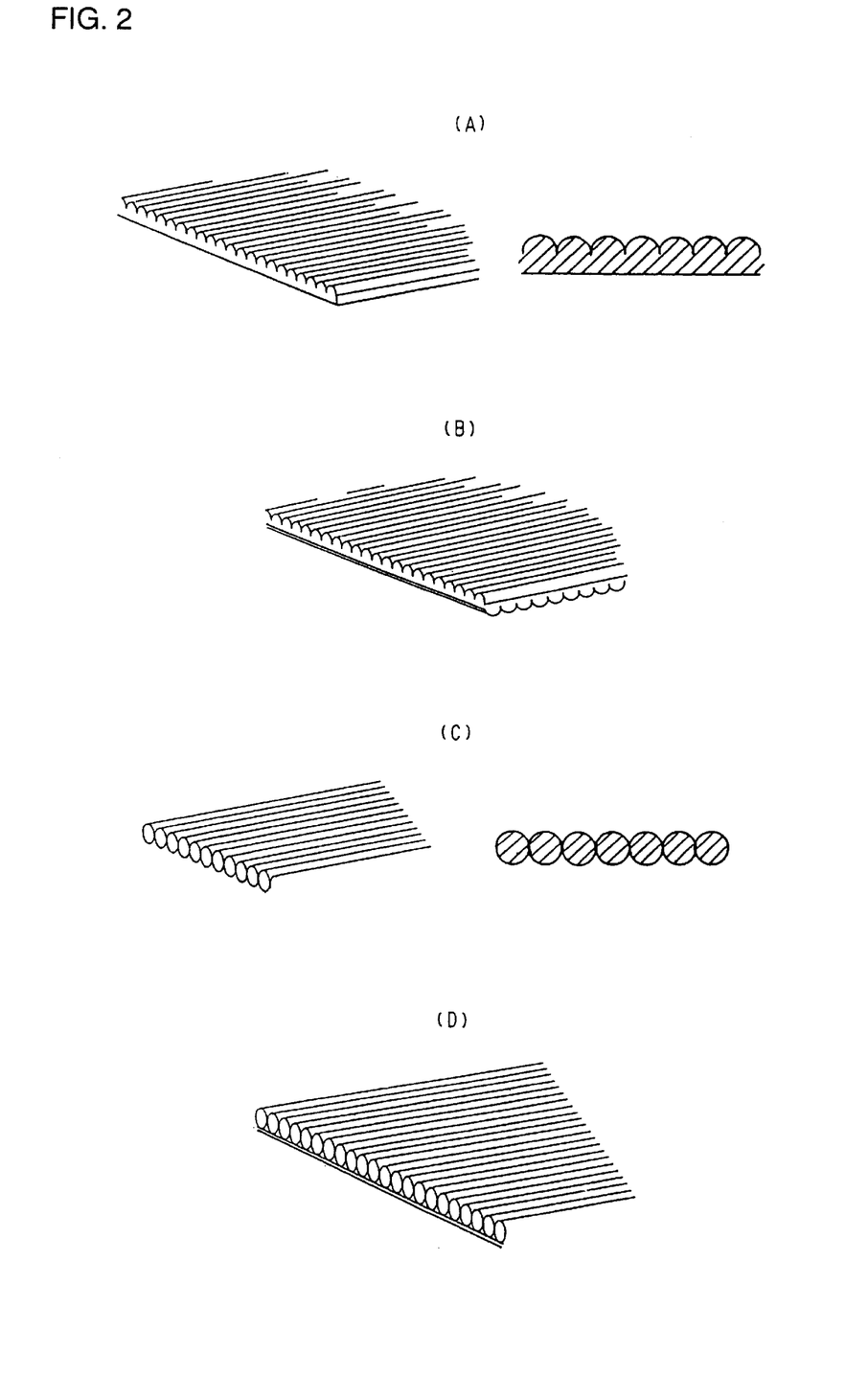
FIG. 2 shows various kinds of transparent bodies used in the present invention, (A) and (C) being a perspective view and a cross-sectional view, respectively, (B) and (d) being perspective views.
Figure 3:
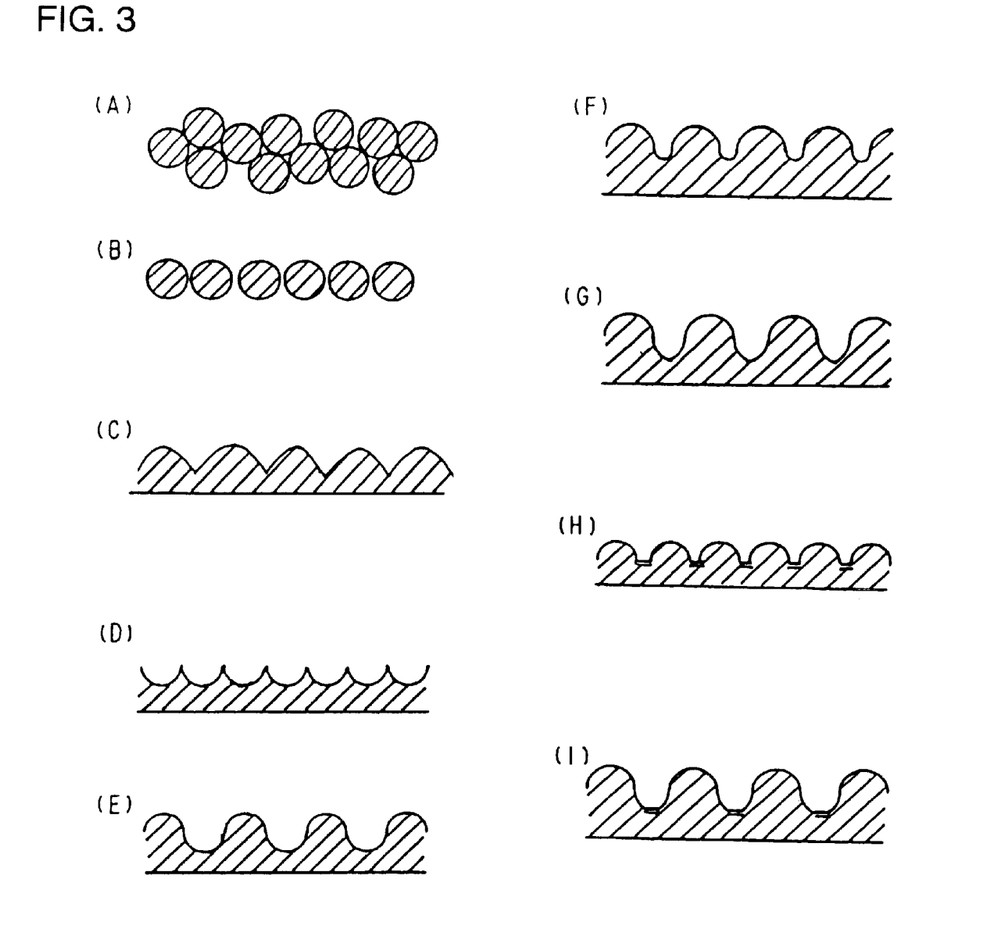
FIG. 3 shows cross-sectional views illustrating various kinds of transparent bodies used in the present invention.

Specific Example:

An experiment was conducted arranging optical fibers of polymer of 0.25 mm in diameter as shown in FIG. 2(D), and using three types of transparent bodies, i.e., a first transparent body fixed on a transparency retaining plate of acrylic resin of 2 mm in thickness with a double-sided adhesive film, a second transparent body consisting of a transparent sheet of approximately 0.16 mm in thickness with multiple protrusions having an angle shaped cross section manufactured by Dai Nippon Printing Co., Ltd. arranged on one surface, and a third transparent body of approximately 0.5 mm in thickness with multiple protrusions having a triangle shaped cross section manufactured by Mitsubishi Rayon Co., Ltd. arranged on one surface.

Figure 11:
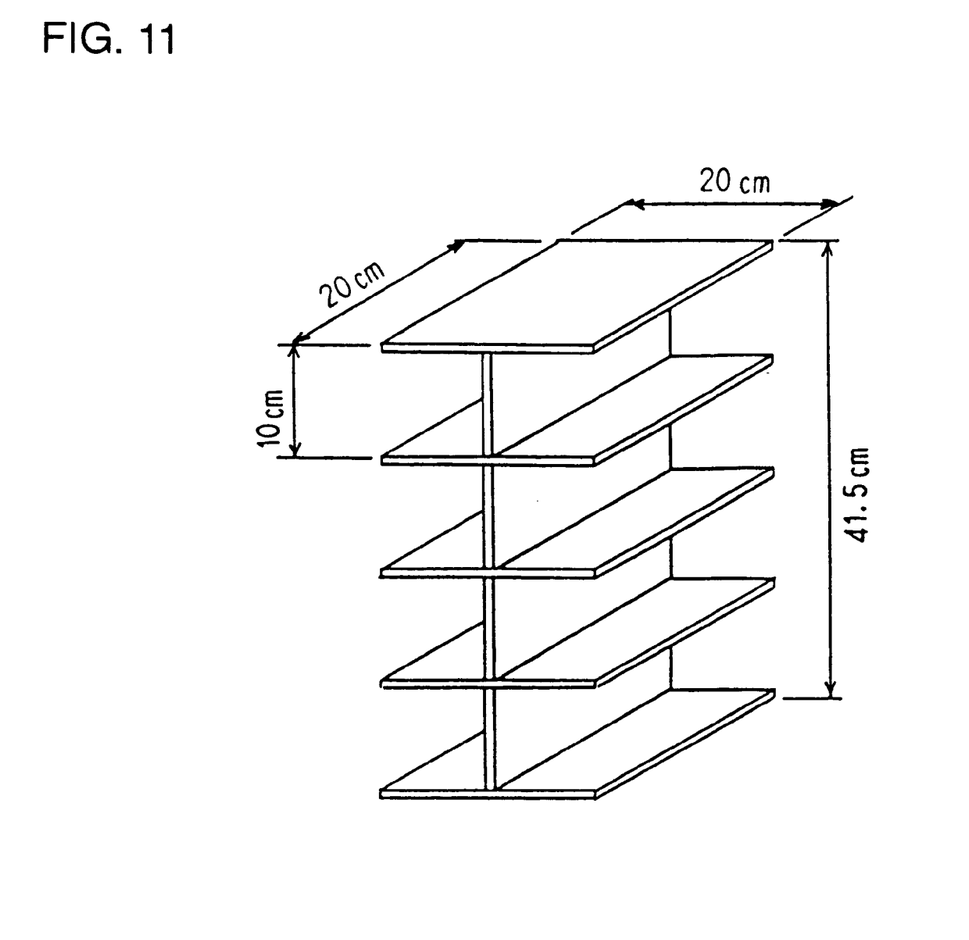
FIG. 11 is a perspective view illustrating a model of a building used in an embodiment example of the present invention.

Two models of a building as shown in FIG. 11 were made using a balsa material of 3 mm in thickness and the transparent bodies were disposed in the models, and by irradiating sunlight on the buildings, effects of the transparent bodies were confirmed with the eye. As a result of the experiment, the characteristics shown in FIGS. 1(C), (D) and (E) and FIG. 6(A) were clearly observed in the first transparent body and the second transparent body. In addition, the characteristic shown in FIG. 6(B) was clearly observed in the third transparent body.

Concerning each transparent body itself, it was confirmed, by irradiating red beams of a commercially available laser beam pointer, that the first and the second transparent bodies have the characteristic of FIG. 9(A) and the third transparent body has the characteristic of FIG. 7(A).

As described above, according to the present invention, it becomes possible to introduce sufficient amount of light into an area or a part that is shaded or has insufficient amount of light due to a structure or other objects.

What is claimed is:

1. A light distribution controlling apparatus comprising:
    a source of light;
    a building, said building having an area, said area having a part which is shaded by an obstacle from said source of light;
    a transparent body suspended above said building having a first surface and a second surface;
    said light being incident on said first surface;
    said light being output from said second surface onto said part;
    said transparent body performing an operation selected from the group consisting of:
        diffusion,
        refraction,
        division, and
        a combination of diffusion and refraction.

2. A light distribution controlling apparatus according to claim 1, wherein said first surface of said transparent body comprises a form selected from the group consisting of:
    a flat plate form, and
    a film form.

3. A light distribution controlling apparatus according to claim 1, wherein said transparent body comprises a form selected from the group consisting of:
    a bundle of multiple mono-filaments;
    bar-shaped bodies,
    an array of multiple mono-filaments or bar-shaped bodies, and
    a textile into which multiple mono-filaments or bar-shaped bodies are woven.

4. A light distribution controlling apparatus according to claim 1, wherein said second surface of said transparent body has a form selected from the group consisting of:
    a flat plate form, and
    a film form.

5. A light distribution controlling apparatus according to claim 1, wherein said first surface comprises further protrusions, said protrusions being formed in parallel with each other.

6. A light distribution controlling apparatus according to claim 5, wherein said protrusions have a cross section selected from the group consisting of:
    an arc form,
    an angle form, and
    a wave form.

7. A light distribution controlling apparatus according to claim 1, wherein said second surface comprises further protrusions, said protrusions being formed in parallel with each other.

8. A light distribution controlling appartus according to claim 7, wherein said protrusions have a cross section selected from the group consisting of:
    an arc form,
    an angle form, and
    a wave form.

9. A light distribution controlling apparatus according to claim 1, wherein a second transparent body is disposed between said obstacle and said building.

10. A light distribution controlling apparatus according to claim 1, wherein said obstacle is a second building.

11. A luminous flux density controlling apparatus comprising:
    light;
    a first area;
    a first portion of said light being incident on said first area;
    a second area;
    a second portion of said light being incident on said second area;
    a transparent body interposed between said light and said first area;
    wherein said transparent body increases said second portion of light incident on said second area and reduces said first portion of light incident on said first area by performing on the first portion an operation selected from the group consisting of:
        diffusion,
        refraction,
        division, and
        complex of diffusion and refraction.

12. A luminous flux density controlling apparatus according to claim 11, wherein said transparent body comprises further a surface; and
    wherein said surface has a form selected from the group consisting of:
        a flat plate form, and
        a film form.

13. A luminous flux density controlling apparatus according to claim 11, said transparent body comprises a form selected from the group consisting of:
    a bundle of multiple mono-filaments;
    bar-shaped bodies,
    an array of multiple mono-filaments or bar-shaped bodies, and
    a textile into which multiple mono-filaments or bar-shaped bodies are woven.

14. A luminous flux density controlling apparatus according to claim 11, wherein said surface comprises further protrusions, said protrusions being formed in parallel with each other.

15. A luminous flux density controlling apparatus according to claim 14, wherein said protrusions have a cross section selected from the group consisting of:

an arc form, an angle form, and a wave form.

16. A partitioning method comprising the steps of:

partitioning a space into a first part and a second part with a partition, wherein a view from said first part of an object in said second part is obstructed by said partition;

conducting daylight to said first part of said space;

diffusing said daylight using a transparent body; and transmitting said daylight to said second part.

17. A partitioning method according to claim 16, wherein said transparent body comprises a form selected from the group consisting of:

a flat plate form, and a film form.

18. A partitioning method according to claim 16, wherein said transparent body comprises a form selected from the group consisting of:

a bundle of multiple mono-filaments, bar-shaped bodies, an array of multiple mono-filaments and bar-shaped bodies, and a textile into which multiple mono-filaments and bar-shaped bodies are woven.

19. A partitioning method according to claim 16, wherein said transparent body comprises further a surface, said surface having multiple protrusions are formed in parallel with each other.

20. A partitioning method according to claim 19, wherein said protrusions have a cross section selected from the group consisting of:

an arc form, an angle form, and a wave form.

21. A partitioning method comprising the steps of:

partitioning a space into a first part and a second part;

conducting daylight to said first part;

refracting said daylight using a transparent body; and transmitting said daylight to said second part.

22. A partitioning method according to claim 21, wherein said transparent body comprises a form selected from the group consisting of:

a flat plate form, and a film form.

\* \* \* \* \*